United States Patent [19]

Le Noane et al.

[11] 4,160,580

[45] Jul. 10, 1979

[54] DEVICE FOR TERMINATING THE FIBERS OF AN OPTICAL FIBER RIBBON WITH CONNECTORS

[76] Inventors: Georges E. Le Noane, Kerrougant Bras, Tregastel; André M. Mathern, Rte. du Rusquet Brelévenez, Lannion, both of France

[21] Appl. No.: 915,660

[22] Filed: Jun. 15, 1978

[30] Foreign Application Priority Data

Jun. 17, 1977 [FR] France .................... 77 18675

[51] Int. Cl.² .................................... G02B 5/14
[52] U.S. Cl. ........................ 350/96.21; 350/96.22
[58] Field of Search .......... 350/96.15, 96.20, 96.21, 350/96.22

[56] References Cited

U.S. PATENT DOCUMENTS

| | | | |
|---|---|---|---|
| 3,864,018 | 2/1975 | Miller | 350/96.21 |
| 3,871,935 | 3/1975 | Gloge et al. | 350/96.21 X |
| 3,912,574 | 10/1975 | Cherin et al. | 350/96.21 X |
| 4,046,454 | 9/1977 | Pugh | 350/96.21 |
| 4,108,534 | 8/1978 | Le Noane et al. | 350/96.21 |
| 4,123,137 | 10/1978 | Marcatili | 350/96.21 |

OTHER PUBLICATIONS

Casler, "Manufacturing Matched Fiber Optical Arrays," *IBM Tech. Discl. Bulletin*, vol. 14, No. 3, Aug. 1971, p. 829.

*Primary Examiner*—John K. Corbin
*Assistant Examiner*—John D. Lee
*Attorney, Agent, or Firm*—Abraham A. Saffitz

[57] ABSTRACT

Device for providing the end portions of the fibers of a flat optical fiber ribbon with connectors. It comprises an elongated connector having two adjacent inner surfaces defining a re-entrant orthogonal connector dihedron and two adjacent outer surfaces defining a projecting orthogonal connector dihedron and a third surface formed with at least a longitudinal groove, and a template having a first and a second adjacent surfaces defining a re-entrant orthogonal template dihedron. At least two members transverse to the template bear a first groove for receiving the sheathed part of the optical fiber and a second groove aligned with the first groove for receiving the stripped part of the fiber. The projecting connector dihedron is applied against the re-entrant template dihedron and the fiber is guided in the grooves on each side of its path along the connector groove, whereby it can be bonded to the connector in predefined position.

6 Claims, 9 Drawing Figures

DEVICE FOR TERMINATING THE FIBERS OF AN OPTICAL FIBER RIBBON WITH CONNECTORS

The present invention relates to a device for providing the end portions of optical fibers with connectors, particularly the ends portions of fibers forming an optical fiber ribbon.

BACKGROUND OF THE INVENTION

1. Field of the Invention

As known in the art, any means of connecting fibers must resolve the alignment problem. When one considers that optical fibers have core diameters ranging from a few microns to a few tens of microns, and that an alignment error of as little as a diameter will result in a coupling loss of about 3 dB, the magnitude of the problem becomes apparent.

2. Description of the Pior Art

U.S. patent applications Ser. No. 762,312 filed Jan. 25, 1977, now U.S. Pat. No. 4,108,534 issued Aug. 22, 1978, has disclosed an apparatus for on-site connection of two optical fiber cables of the type having a central core with a periphery formed with regularly spaced grooves, each groove holding a fiber in the bottom thereof. The apparatus comprises two extension members, one for each cable to be connected, these extension members having a cylindrical shape and being formed with grooves having the same angular pitch as the fibers in the cables. After the fibers have been removed from the grooves of the end portions of the cables and the extension members have been secured to the cable cores, the fibers are bent back into the grooves of the extension members and bonded thereto.

Precise connecting is due to the fact that the grooved extension members are accurately calibrated members and that the fibers are passed to the bottom of the grooves before being bonded therein. Although this method of connecting fiber cables gives good results, it is not applicable to optical fiber ribbons.

U.S. Pat. No. 3,871,935 issued Mar. 18, 1975 disclosed a method of encapsulating and terminating an optical fiber ribbon comprising a plurality of optical fibers embedded in a common protective jacket including the steps of:

dissolving the protective jacket along a portion of said ribbon thereby exposing the plurality of individual fibers;

placing the fibers thus exposed in a mold containing a positioning jig which aligns said fibers in a prefined manner relative to each other;

adding an encapsulating material to said mold thereby encapsulating the fibers located therein in said predefined manner;

and dividing said encapsulated fibers into two parts thereby exposing the transverse surfaces of said fibers.

In this method, the fibers are guided by the positioning jig at a single point of their path in the plane of the jig and the angular connection error due to the obliquity of the fibers is not taken into consideration.

SUMMARY OF THE INVENTION

In accordance with the present invention, a device for providing the end portions of the fibers of a flat optical fiber ribbon with connectors comprises (1) elongated connectors made of rigid material and having two adjacent inner surfaces defining a re-entrant orthogonal connector dihedron, two adjacent outer surfaces defining a projecting orthogonal connector dihedron and a third surface formed with at least a longitudinal groove, said groove being relatively wide and deep so that a sheathed fiber can be inserted therein with clearance, (2) a template having a first and a second adjacent surface defining a re-entrant orthogonal template dihedron, said surfaces intersecting along a template reference direction, (3) at least two transverse members having upper surfaces lying in one and the same plane parallel to said first template dihedron surface, being spaced apart by a length exactly equal to that of an elongated connector and defining a connector recess, (4) a first groove formed in one of said transverse members receiving the sheathed part of the end portion of said optical fiber and a second groove aligned with said first groove and formed in the second of said transverse members receiving the stripped part of the end portion of said optical fiber, the optical fiber guided in said grooves being parallel to said template reference direction and (5) means for inserting an elongated connector into said connector recess with the projecting connector dihedron accomodating the re-entrant template dihedron, the optical fiber being guided, when passing in the longitudinal connector groove, through aligned first and second grooves on each side of said connector, whereby it can be bonded to said connector in predefined position.

BRIEF DESCRIPTION OF THE DRAWING

Other objects, features and advantages of the device according to the invention will be clear from the following detailed description of preferred embodiments and from the accompanying drawings, in which.

DESCRIPTION OF THE PREFERRED EMBODIMENTS

Figure 1A:
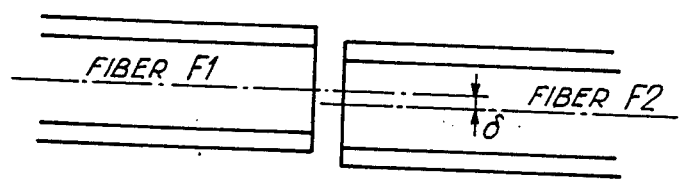
FIGS. 1A, 1B, 1C are diagrams showing three possible causes of insertion loss at the connection between two optical fibers.
Figure 1B:
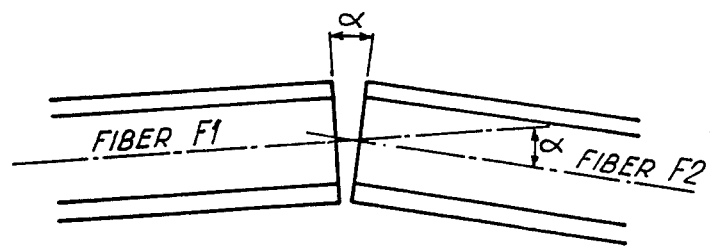
Figure 1C:
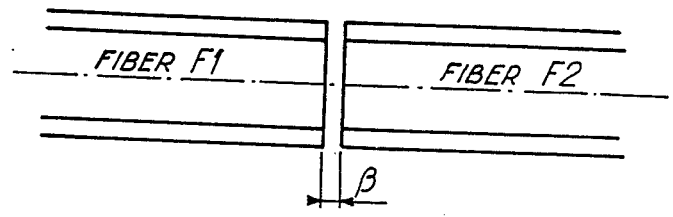

In order to interconnect two elementary optical fibers $F_1$, $F_2$, it is necessary to reduce the following three faults to a minimum:

the linear transverse error $\delta$ (FIG. 1A);
the angular error $\alpha$ (FIG. 1B); and
the linear longitunal error $\beta$ (FIG. 1C).

In the case, for example, of a fiber having a core diameter of 80 μm, the following must be obtained:

$\delta < 3$ μm
$\alpha < 1°$
$\beta < 30$ μm

As can be seen, mutual centering having an accuracy of 1 μm is necessary for eliminating the fault δ which, more particularly, may result from a slight difference in the diameters of the fibers to be connected.

Finally, the facing end faces of the optical fibers $F_1$, $F_2$ must have substantially straight cross-sections and have a good surface state, though the latter condition can usually be compensated by using a silicone lubricant which ensures a continuity of index between the fibers.

Figure 2:
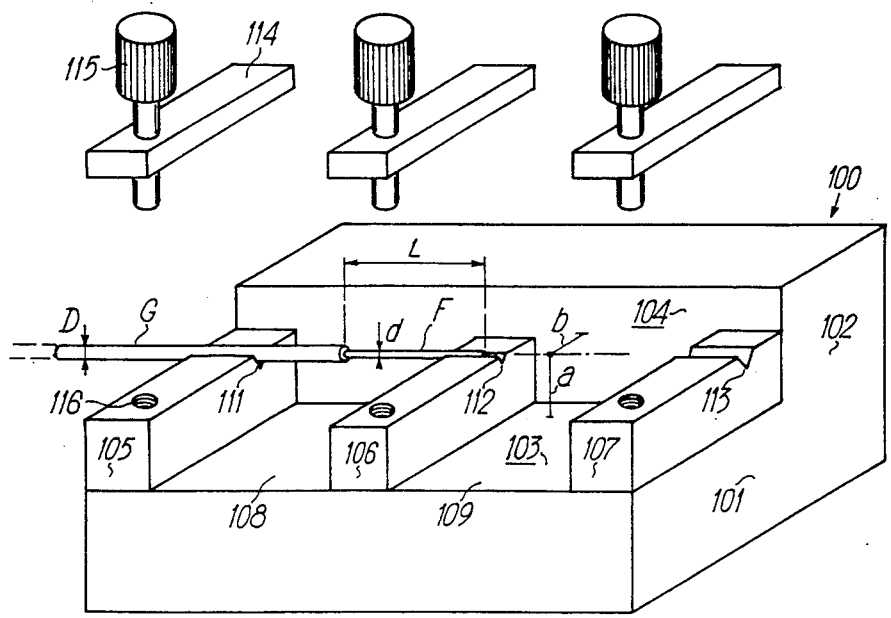
FIG. 2 is diagrammatic perspective view of a standard template having two recesses for mounting terminals on single-fiber cables, FIG. 2 also showing three plates for manually clamping the fibers in the grooves in the template.

As shown in FIG. 2, a template 100 according to the invention is substantially a portion of a thick angle member having a first wall 101 to be placed horizontally, e.g. on a table, and a second wall 102 orthogonal to the first one. The inner horizontal and vertical surfaces 103, 104 of walls 101, 102 respectively are exactly flat and orthogonal and constitute the "reference" surfaces of the template.

Wall 103 is secured to three prismatic bearings, identical in the example shown, having a rectangular cross-section and projecting into dihedron 103, 104 above wall 101 and perpendicular to wall 102. Two end bearings 105, 107 touch the side surfaces of template 100, and a central bearing 106, equidistant from the preceding bearings, forms two free hollow spaces or recesses 108, 109 between it and to outer bearings, the recesses being identical and substantially parallelpipedal, to match the shape of the terminals according to the invention, as we shall see hereinafter.

The three bearings 105, 106, 107 have grooves 111, 112, 113 respectively in their top surfaces, the grooves being in line and extending parallel to the edge of dihedron 103, 104. In the example shown, the grooves have a V cross-section. The central groove 112 is such that a bare optical fiber F of diameter d, when pressed to the bottom of the groove, has its geometrical axis at distances a, b (to within 1 μm) from the reference surfaces 103, 104 respectively. The end grooves 111, 113 are similarly designed for a sheathed fiber G of diameter D pressed to the bottom of one of the end grooves.

Template 100 also comprises three elements associated with bearings 105, 106 and 107 respectively, the elements being identical and, in the example shown, each element comprising a rectangular plate 114 having substantially the same width as a top surface of a bearing, and a screw 115 having a milled cylindrical head prolonged by a threaded rod and adapted to co-operate with a corresponding thread 116 in the associated bearing. Elements 114 and 115 are adapted to press the bare fibers F fully into groove 112, and to press the sheathed fibers G fully into grooves 111 and 113.

Figure 3:
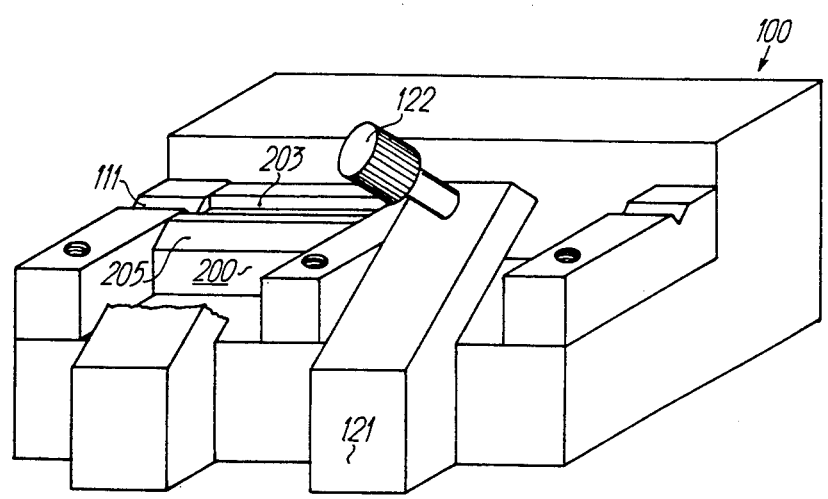
FIG. 3 is a view corresponding to FIG. 2 except that a bare terminal has been pressed down to the bottom of the left recess of the template, the right of FIG. 3 also showing one of the two vices for manually clamping terminals in the recesses of the template.
Figure 4A:
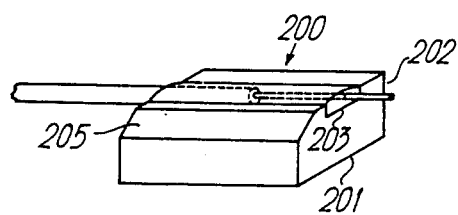
FIGS. 4A and 4B are diagrammatic perspective views of a terminal in which a partly stripped sheathed fiber has been secured in the desired position, before (FIG. 4A) and after (FIG. 4B) the front surface of the terminal where the fiber terminates, has been levelled.
Figure 4B:
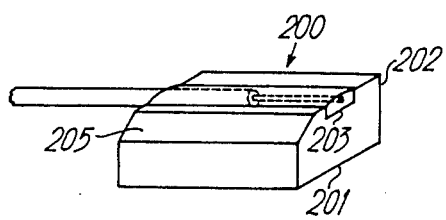

Each time it is used, template 100 in FIG. 3 is adapted to receive at least an initially bare terminal 200, as shown on the left to FIG. 3 or FIGS. 4A and 4B. Each terminal 200 is substantially parallelepipedal and its dimensions are such that it can be pressed to the bottom, without clearance, into a recess 108 or 109 of template 100. Each teminal 200 has two outer surfaces 201 and 202 (see FIGS. 4A, 4B) which are exactly flat and orthogonal and constitute the "reference" surfaces of the terminal. They are adapted to bear fully against the reference surfaces 103, 104 of the template respectively. The top surface of each terminal 200 is formed with a groove 203 extending parallel to the edge of dihedron 201, 202 and having a cross-section which is e.g. rectangular but in all cases is sufficiently wide and deep to ensure that when terminal 200 has been passed to the bottom of a recess 108 or 109 of template 100, the surrounding grooves 111, 112 or 112, 113 of the template open fully into groove 203.

Template 100 also comprises two members associated with recesses 108, 109 respectively, the members being identical and, in the example shown, each comprising a bent prismatic block 121 and a screw 122 having a milled cylindrical head prolonged by a threaded rod co-operating with a bevel 205 in the terminal, which will be described hereinafter.

Members 121, 122 are adapted to press terminals 200 down to the bottom of recesses 108, 109 in template 100.

The device is used as follows:

A single terminal (e.g. 200) is pressed to the bottom, e.g. by a vertical movement, into recess 108 of template 100 and secured there by a member 121, 122.

In the particularly simple case of a single sheathed fiber G, it is stripped to the fiber F over a length L substantially equal to half the width of recess 108 plus half the width of bearing 106. Fiber GF is placed in grooves 111, 203, 112 so that the free end of the fiber moves along the central groove 112 up to approximately half the width of bearing 106. Fiber GF is pressed to the bottom of the grooves, using two elements 114–115. Next, the fiber is placed so that its geometrical axis is at distances a, b to, within 1 μm, from the template surfaces 103, 104, i.e. from surfaces 201, 202 of the terminal, and the portion thereof inserted in groove 203 of the terminal is not in contact therewith.

Next, fiber GF is firmly secured to terminal 200 by means of a resin, which fills the entire space left free by the fiber in groove 203.

After the terminal has been extracted from the templace (FIG. 4A), it is sawn (FIG. 4B), i.e. simply by cutting off a length of the order of 1/10 mm from the side surface of the terminal where fiber GF terminates, in order to compensate any slant in the position of the fiber in groove 203.

The result is a "left" connecting terminal (since it was placed in the left recess 108 of template 100). If the terminal had been placed in the right recess 109, a "right" connecting terminal would have been obtained. If two terminals were placed in recesses 108 and 109, a left terminal and a right terminal would be obtained simultaneously.

Of course, since all standard templates are assumed to be exactly identical, left connecting terminals are interchangeable and so are right connecting terminals, but left terminals cannot be exchanged for right terminals or vice versa.

For this reason, the following mistake-correcting means are used:

The groove in the terminal is offset with respect to the plane of symmetry parallel to the reference surface 202; and The terminal edge remote from the edge of the reference dihedron is lowered by bevel 205.

In order to interconnect two single-fiber cables (though this is outside the scope of the invention) one cable must have a left terminal and the other must have a right terminal and the terminals must be juxtaposed so that their reference dihedra are exactly in line, and the free facing front surfaces of the terminals must be pressed against one another, interposing a silicone lubricant of the previously-mentioned kind so as to ensure continuity of index from one fiber to the other.

Figure 5:
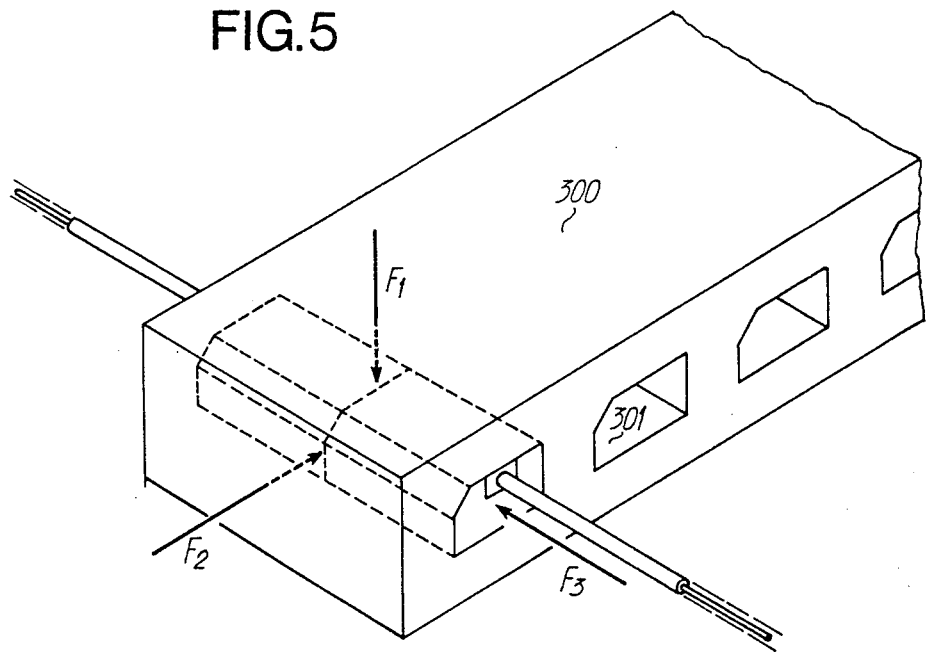
FIG. 5 is a diagrammatic perspective view of a strip connecting a number of single-fiber cables provided with terminals according to the invention.

FIG. 5 shows a connecting strip 300 for a number of single-fiber cables having terminals according to the invention.

Strip 300 has cavities 301 having the same cross-section as the terminals. Arrows $F_1$, $F_2$, $F_3$ shows the pressures which must be exerted on the terminals, when in each cavity 301, in order to fulfil the aforementioned conditions.

Figure 6:
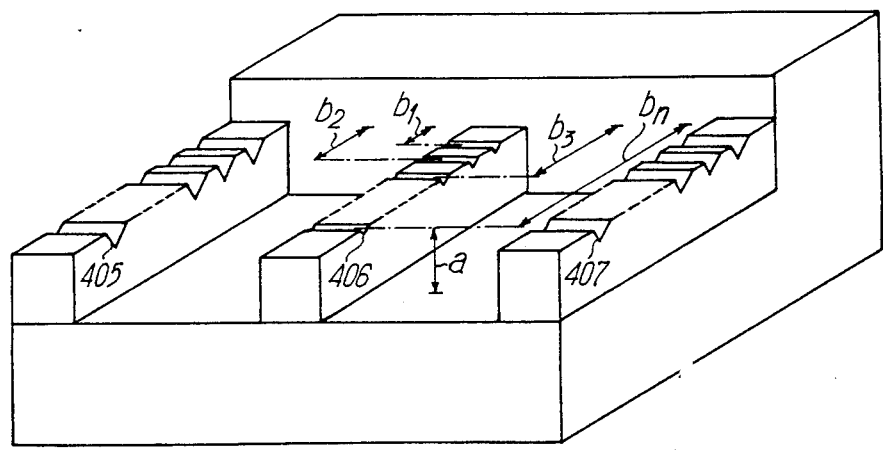
FIG. 6 is a diagrammatic perspective view of a standard template having two recesses for mounting terminals on flat multi-fiber cables.

Of course, the invention is in no way limited to the example described and shown. It can be varied in numerous ways accessible to the skilled addressee but still forming part of the invention. For example, the calibrated template may have a single terminal recess instead of two; it may, like the template in FIG. 6, have three sets of n grooves 405, 406, 407 so that terminals can be mounted on flat cables having n fibers; the means securing each terminal in the template and/or securing the fibers in the grooves thereof can be jacks, preferably hydraulic or pneumatic.

The V grooves in the bearings of the template many advantageously be replaced by grooves having a preferably rectangular cross-section, each comprising two perfectly cylindrical rods therein, with micrometer blocks if required; and the right reference dihedron of the template may advantageously be replaced by a set of three projections, each ensuring isostatic contact.

What we claim is:

1. A device for providing the end portions of the fibers of a flat optical fiber ribbon with connectors comprising:
   at least an elongated substantially parallelepipedal connector made of rigid material having two adjacent inner surfaces forming a re-entrant right connector dihedron and two adjacent outer surfaces forming a projecting right connector dihedron and a third surface formed with at least a longitudinal groove, said groove being relatively wide and deep so that a sheathed fiber can be inserted therein with clearance;
   a template having a first and a second adjacent surfaces forming a re-entrant right template dihedron, said surfaces intersecting along a template reference direction;
   at least two transverse members secured to the first surface of said template dihedron and perpendicular to the second surface thereof, said transverse members having upper surfaces lying in one and the same plane parallel to said first template dihedron surface, being spaced apart by a length exactly equal to that of an elongated connector and defining a connector recess;
   a first groove formed in one of said at least two transverse members receiving the sheathed part of the end portion of said optical fiber and a second groove aligned with said first groove and formed in the second of said at least two transverse members receiving the stripped part of the end portion of said optical fiber, the optical fiber guided in said grooves being parallel to said template reference direction;
   means for inserting an elongated connector into said connector recess with the projecting connector dihedron accomodating the re-entrant template dihedron, the optical fiber being guided, when passing in the longitudinal connector groove, through aligned first and second grooves on each side of said connector, whereby it can be bonded to said connector in predefined position.

2. A device for providing the end portions of the fibers of a flat optical fiber ribbon as set forth in claim 1, further comprising means for pressing and holding the sheathed part of the end portion of the optical fiber in the inside of the first groove and means for pressing and holding the stripped part of the end portion of the optical fiber in the inside of comprising means for pressing and holding the sheathed part of the end portion of the optical fiber in the inside of the first groove and means for pressing and holding the stripped part of the end portion of the optical fiber in the inside of the second groove.

3. A device for providing the end portions of the fibers of a flat optical fiber ribbon as set forth in claim 1, further comprising means for holding the elongated connector in a connector recess of the template, the projecting connector dihedron surfaces abutting against the re-entrant template dihedron surfaces.

4. A device for providing the end portions of the fibers of a flat optical fiber ribbon as set forth in claim 1, in which the third surface of the elongated connector formed with at least a longitudinal groove has formed therein a bevel edge and the device further comprises screw means secured to the template and cooperating with said bevel-edge for holding the connector in the connector recess.

5. A device for providing the end portions of the fibers of a flat optical fiber ribbon as set forth in claim 1 in which the first and second grooves are V-shaped grooves.

6. A device for providing the end portions of the fibers of a flat optical fiber ribbon with connectors comprising:
   elongated, substantially parallelepipedal connectors made of rigid material, each having two adjacent inner surfaces forming a re-entrant right connector dihedron and two adjacent outer surfaces forming a projecting right connector dihedron and a third surface formed with a plurality of n longitudinal grooves, said grooves being relatively wide and deep so that a sheathed fiber can be inserted therein with clearance;
   a template having a first and a second adjacent surfaces forming a re-entrant right template dihedron, said surfaces intersecting along a template reference direction;
   three transverse members secured to the first surface of said template dihedron and perpendicular to the second surface thereof, said transverse members having upper surfaces lying in one and the same plane parallel to said first template dihedron surface, being spaced apart from one another by a length exactly equal to that of an elongated connector and defining two connector recesses;
   a plurality of n first grooves formed in the outer transverse members receiving the sheathed part of the end portions of said optical fibers and a plurality of n second grooves formed in the intermediate transverse member receiving the stripped part of the end portions of said optical fibers, the optical fiber guided in said grooves being parallel to said template reference direction;
   means for inserting an elongated connector into one of said connector recesses with the projecting connector dihedron accomodating the re-entrant template dihedron, the optical fibers being guided, when passing in the longitudinal connector grooves through aligned first and second grooves on both sides of said connector, whereby they can be bonded to said connector in predefined positions.

* * * * *